US011496896B2

(12) United States Patent
Kunz et al.

(10) Patent No.: US 11,496,896 B2
(45) Date of Patent: Nov. 8, 2022

(54) USER EQUIPMENT AUTHENTICATION

(71) Applicant: Lenovo (Singapore) PTE. LTD., New Tech Park (SG)

(72) Inventors: Andreas Kunz, Ladenburg (DE); Genadi Velev, Darmstadt (DE); Joachim Loehr, Wiesbaden (DE)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 16/778,846

(22) Filed: Jan. 31, 2020

(65) Prior Publication Data

US 2020/0288313 A1 Sep. 10, 2020

Related U.S. Application Data

(60) Provisional application No. 62/812,775, filed on Mar. 1, 2019.

(51) Int. Cl.
*H04W 12/06* (2021.01)
*H04W 12/63* (2021.01)
*H04W 12/122* (2021.01)

(52) U.S. Cl.
CPC ......... *H04W 12/06* (2013.01); *H04W 12/122* (2021.01); *H04W 12/63* (2021.01)

(58) Field of Classification Search
CPC ... H04W 12/06; H04W 12/63; H04W 12/122; H04W 12/12; H04W 12/121
See application file for complete search history.

(56) References Cited

U.S. PATENT DOCUMENTS

| 8,351,900 B2* | 1/2013 | Lotvonen | H04L 63/1466 455/410 |
| 2009/0017863 A1* | 1/2009 | Rowley | H04W 12/125 455/550.1 |
| 2010/0323714 A1* | 12/2010 | Schmidt | H04W 48/18 455/456.1 |
| 2011/0151796 A1* | 6/2011 | Walby | H04W 12/126 455/67.7 |
| 2014/0087693 A1 | 3/2014 | Walby et al. | |
| 2015/0140997 A1* | 5/2015 | Goldfarb | H04W 48/16 455/424 |

(Continued)

OTHER PUBLICATIONS

3GPP, "3rd Generation Partnership Project; Technical Specification Group Services and System Aspects; Security architecture and procedures for 5G system", 3GPP TS 33.501 V15.3.0, Dec. 2018, pp. 1-179.

(Continued)

*Primary Examiner* — Richard A McCoy
(74) *Attorney, Agent, or Firm* — Kunzler Bean & Adamson

(57) ABSTRACT

Apparatuses, methods, and systems are disclosed for user equipment authentication. One method includes transmitting, from a user equipment, a request message to one or more network devices. The method includes, in response to transmitting the request message, attempting authentication with the one or more network devices. The method includes, in response to successfully authenticating with the one or more network devices, transmitting a message comprising first location information corresponding to the user equipment to the one or more network devices.

20 Claims, 9 Drawing Sheets

(56) References Cited

U.S. PATENT DOCUMENTS

| | | | | |
|---|---|---|---|---|
| 2015/0334566 A1* | 11/2015 | Selander | ................ | H04W 4/14 |
| | | | | 455/411 |
| 2016/0309332 A1* | 10/2016 | Norrman | ............... | H04W 24/08 |
| 2018/0367998 A1* | 12/2018 | Kunz | ................... | H04W 24/10 |
| 2019/0191483 A1* | 6/2019 | Ryoo | ................ | H04W 12/0433 |
| 2019/0200264 A1* | 6/2019 | Kim | ...................... | H04W 60/04 |
| 2021/0067972 A1* | 3/2021 | McGrath | ................. | H04W 4/90 |
| 2021/0136585 A1* | 5/2021 | Rosberg | ................ | H04W 24/08 |

OTHER PUBLICATIONS

Lenovo, Motorola Mobility, "Solution on Authentication Relay Attack", 3GPP TSG-SA WG3 Meeting #94Ad-Hoc S3-190870, Mar. 11-15, 2019, pp. 1-3.

3GPP, "3rd Generation Partnership Project; Technical Specification Group Services and System Aspects Study on 5G Security Enhancement against False Base Stations", 3GPP TR 33.809 V0.7.0, Oct. 2019, pp. 1-66.

3GPP, "3rd Generation Partnership Project; Technical Specification Group Services and System Aspects; Study on the security aspects of the next generation system", 3GPP TR 33.899 V1.3.0, Aug. 2017, pp. 1-605.

PCT/IB2020/000051 , "Notification of transmittal of the international search report and the written opinion of the International searching authority or the declaration", ISA, dated Jul. 6, 2020, pp. 1-15.

Huawei, Hisilicon, "Scope proposal for TR on 5G URLLC security", 3GPP TSG SA WG3 (Security) Meeting #93 S3-183805, Nov. 12-16, 2018, pp. 1-1.

3GPP, "3rd Generation Partnership Project; Technical Specification Group Services and System Aspects; Security architecture and procedures for 5G system (Release 15)", 3GPP TS 33.501 V15.3.1, Dec. 2018, pp. 1-181.

3GPP, "3rd Generation Partnership Project; Technical Specification Group Services and System Aspects; Study on 5G Security Enhancement against False Base Stations (Release 16)", 3GPP TR 33.809 V0.2.0, Feb. 2019, pp. 1-16.

3GPP, "3rd Generation Partnership Project; Technical Specification Group Services and System Aspects; Universal Geographical Area Description (GAD) (Release 15)", 3GPP TS 23.032 V15.1.0, Sep. 2018, pp. 1-32.

\* cited by examiner

USER EQUIPMENT AUTHENTICATION

CROSS-REFERENCE TO RELATED APPLICATIONS

This application claims priority to U.S. Patent Application Ser. No. 62/812,775 entitled "FALSE BASE STATION AUTHENTICATION RELAY DETECTION" and filed on Mar. 1, 2019 for Andreas Kunz, which is incorporated herein by reference in its entirety.

FIELD

The subject matter disclosed herein relates generally to wireless communications and more particularly relates to user equipment authentication.

BACKGROUND

The following abbreviations are herewith defined, at least some of which are referred to within the following description: Third Generation Partnership Project ("3GPP"), $5^{th}$ Generation ("5G"), Authentication, Authorization, and Accounting ("AAA"), Positive-Acknowledgment ("ACK"), Aggregation Level ("AL"), Access and Mobility Management Function ("AMF"), Access Point ("AP"), Access Stratum ("AS"), Authentication Server Function ("AUSF"), Beam Failure Detection ("BFD"), Beam Failure Recovery ("BFR"), Binary Phase Shift Keying ("BPSK"), Base Station ("BS"), Buffer Status Report ("BSR"), Bandwidth ("BW"), Bandwidth Part ("BWP"), Cell RNTI ("C-RNTI"), Carrier Aggregation ("CA"), Contention-Based Random Access ("CBRA"), Clear Channel Assessment ("CCA"), Common Control Channel ("CCCH"), Control Channel Element ("CCE"), Cyclic Delay Diversity ("CDD"), Code Division Multiple Access ("CDMA"), Control Element ("CE"), Contention-Free Random Access ("CFRA"), Closed-Loop ("CL"), Coordinated Multipoint ("CoMP"), Channel Occupancy Time ("COT"), Cyclic Prefix ("CP"), Cyclical Redundancy Check ("CRC"), Channel State Information ("CSI"), Channel State Information-Reference Signal ("CSI-RS"), Common Search Space ("CSS"), Control Resource Set ("CORESET"), Discrete Fourier Transform Spread ("DFTS"), Downlink Control Information ("DCI"), Downlink ("DL"), Demodulation Reference Signal ("DMRS"), Data Radio Bearer ("DRB"), Discontinuous Reception ("DRX"), Downlink Pilot Time Slot ("DwPTS"), Enhanced Clear Channel Assessment ("eCCA"), Enhanced Mobile Broadband ("eMBB"), Evolved Node B ("eNB"), Effective Isotropic Radiated Power ("EIRP"), European Telecommunications Standards Institute ("ETSI"), Frame Based Equipment ("FBE"), Frequency Division Duplex ("FDD"), Frequency Division Multiplexing ("FDM"), Frequency Division Multiple Access ("FDMA"), Frequency Division Orthogonal Cover Code ("FD-OCC"), Frequency Range 1—sub 6 GHz frequency bands and/or 410 MHz to 7125 MHz ("FR1"), Frequency Range 2—24.25 GHz to 52.6 GHz ("FR2"), Universal Geographical Area Description ("GAD"), 5G Node B or Next Generation Node B ("gNB"), Global Navigation Satellite System ("GNSS"), General Packet Radio Services ("GPRS"), Guard Period ("GP"), Global Positioning System ("GPS"), Global System for Mobile Communications ("GSM"), Globally Unique Temporary UE Identifier ("GUTI"), Home AMF ("hAMF"), Hybrid Automatic Repeat Request ("HARQ"), Home Location Register ("HLR"), Handover ("HO"), Home PLMN ("HPLMN"), Home Subscriber Server ("HSS"), Identity or Identifier ("ID"), Information Element ("IE"), International Mobile Equipment Identity ("IMEI"), International Mobile Subscriber Identity ("IMSI"), International Mobile Telecommunications ("IMT"), Internet-of-Things ("IoT"), Layer 1 ("L1"), Layer 2 ("L2"), Layer 3 ("L3"), Licensed Assisted Access ("LAA"), Local Area Network ("LAN"), Load Based Equipment ("LBE"), Listen-Before-Talk ("LBT"), Logical Channel ("LCH"), Logical Channel Prioritization ("LCP"), Log-Likelihood Ratio ("LLR"), Long Term Evolution ("LTE"), Multiple Access ("MA"), Medium Access Control ("MAC"), Multimedia Broadcast Multicast Services ("MBMS"), Modulation Coding Scheme ("MCS"), Master Information Block ("MIB"), Multiple Input Multiple Output ("MIMO"), Mobility Management ("MM"), Mobility Management Entity ("MME"), Mobile Network Operator ("MNO"), massive MTC ("mMTC"), Maximum Power Reduction ("MPR"), Machine Type Communication ("MTC"), Multi User Shared Access ("MUSA"), Non Access Stratum ("NAS"), Narrowband ("NB"), Negative-Acknowledgment ("NACK") or ("NAK"), Network Entity ("NE"), Network Function ("NF"), Next Generation ("NG"), NG 5G S-TMSI ("NG-5G-S-TMSI"), Non-Orthogonal Multiple Access ("NOMA"), New Radio ("NR"), NR Unlicensed ("NR-U"), Network Repository Function ("NRF"), Network Slice Instance ("NSI"), Network Slice Selection Assistance Information ("NSSAI"), Network Slice Selection Function ("NSSF"), Network Slice Selection Policy ("NSSP"), Operation, Administration, and Maintenance System ("OAM"), Orthogonal Frequency Division Multiplexing ("OFDM"), Open-Loop ("OL"), Other System Information ("OSI"), Power Angular Spectrum ("PAS"), Physical Broadcast Channel ("PBCH"), Power Control ("PC"), UE to UE interface ("PC5"), Primary Cell ("PCell"), Policy Control Function ("PCF"), Physical Cell Identity ("PCP"), Physical Downlink Control Channel ("PDCCH"), Packet Data Convergence Protocol ("PDCP"), Packet Data Network Gateway ("PGW"), Physical Downlink Shared Channel ("PDSCH"), Pattern Division Multiple Access ("PDMA"), Packet Data Unit ("PDU"), Physical Hybrid ARQ Indicator Channel ("PHICH"), Power Headroom ("PH"), Power Headroom Report ("PHR"), Physical Layer ("PHY"), Public Land Mobile Network ("PLMN"), Physical Random Access Channel ("PRACH"), Physical Resource Block ("PRB"), Physical Sidelink Control Channel ("PSCCH"), Primary Secondary Cell ("PSCell"), Physical Uplink Control Channel ("PUCCH"), Physical Uplink Shared Channel ("PUSCH"), Quasi Co-Located ("QCL"), Quality of Service ("QoS"), Quadrature Phase Shift Keying ("QPSK"), Registration Area ("RA"), RA RNTI ("RA-RNTI"), Radio Access Network ("RAN"), Radio Access Technology ("RAT"), Random Access Procedure ("RACH"), Random Access Preamble Identifier ("RAPID"), Random Access Response ("RAR"), Resource Element Group ("REG"), Radio Link Control ("RLC"), RLC Acknowledged Mode ("RLC-AM"), RLC Unacknowledged Mode/Transparent Mode ("RLC-UM/TM"), Radio Link Monitoring ("RLM"), Radio Network Temporary Identifier ("RNTI"), Reference Signal ("RS"), Remaining Minimum System Information ("RMSI"), Radio Resource Control ("RRC"), Radio Resource Management ("RRM"), Resource Spread Multiple Access ("RSMA"), Reference Signal Received Power ("RSRP"), Round Trip Time ("RTT"), Receive ("RX"), Sparse Code Multiple Access ("SCMA"), Scheduling Request ("SR"), Sounding Reference Signal ("SRS"), Single Carrier Frequency Division Multiple Access ("SC-FDMA"), Secondary Cell ("SCell"), Secondary Cell Group ("SCG"), Shared Channel ("SCH"), Sub-carrier Spacing ("SCS"), Service Data Unit ("SDU"), Serving Gateway ("SGW"), System Information Block ("SIB"), SystemInformationBlockType1 ("SIB1"), SystemInformationBlockType2 ("SIB2"), Subscriber Identity/Identification Module ("SIM"), Signal-to-Interference-Plus-Noise Ratio ("SINR"), Sidelink ("SL"), Service Level Agreement ("SLA"), Sidelink Synchronization Signals ("SLSS"), Session Management Function ("SMF"), Special Cell ("SpCell"), Single Network Slice Selection Assistance Information ("S-NSSAI"), Scheduling Request ("SR"), Signaling Radio Bearer ("SRB"), Shortened TMSI ("S-TMSI"), Shortened TTI ("sTTI"), Synchronization Signal ("SS"), Sidelink SSB ("S-SSB"), Synchronization Signal Block ("SSB"), Subscription Concealed Identifier ("SUCI"), Supplementary Uplink ("SUL"), Subscriber Permanent Identifier ("SUPI"), Tracking Area ("TA"), TA Identifier ("TAI"), TA Update ("TAU"), Timing Alignment Timer ("TAT"), Transport Block ("TB"), Transport Block Size ("TB S"), Time-Division Duplex ("TDD"), Time Division Multiplex ("TDM"), Time Division Orthogonal Cover Code ("TD-OCC"), Temporary Mobile Subscriber Identity ("TMSI"), Transmission Power Control ("TPC"), Transmission Reception Point ("TRP"), Transmission Time Interval ("TTI"), Transmit ("TX"), Uplink Control Information ("UCI"), Unified Data Management Function ("UDM"), Unified Data Repository ("UDR"), User Entity/Equipment (Mobile Terminal) ("UE"), Uplink ("UL"), UL SCH ("UL-SCH"), Universal Mobile Telecommunications System ("UMTS"), User Plane ("UP"), UP Function ("UPF"), Uplink Pilot Time Slot ("UpPTS"), Ultra-reliability and Low-latency Communications ("URLLC"), UE Route Selection Policy ("URSP"), Vehicle-to-Vehicle ("V2V"), Visiting AMF ("vAMF"), Visiting NSSF ("vNSSF"), Visiting PLMN ("VPLMN"), Wide Area Network ("WAN"), and Worldwide Interoperability for Microwave Access ("WiMAX").

In certain wireless communications networks, a false base station may authenticate a user equipment.

BRIEF SUMMARY

Methods for user equipment authentication are disclosed. Apparatuses and systems also perform the functions of the methods. One embodiment of a method includes transmitting, from a user equipment, a request message to one or more network devices. In some embodiments, the method includes, in response to transmitting the request message, attempting authentication with the one or more network devices. In certain embodiments, the method includes, in response to successfully authenticating with the one or more network devices, transmitting a message comprising first location information corresponding to the user equipment to the one or more network devices.

One apparatus for user equipment authentication includes a transmitter that transmits a request message to one or more network devices. In certain embodiments, the apparatus includes a processor that, in response to transmitting the request message, attempts to authenticate with the one or more network devices; wherein, in response to successfully authenticating with the one or more network devices, the transmitter transmits a message comprising first location information corresponding to the apparatus to the one or more network devices.

Another embodiment of a method for user equipment authentication includes receiving a request message from a user equipment. In some embodiments, the method includes, in response to receiving the request message, attempting authentication with the user equipment. In certain embodiments, the method includes, in response to successfully authenticating with the user equipment, receiving a message comprising first location information corresponding to the user equipment.

Another apparatus for user equipment authentication includes a receiver that receives a request message from a user equipment. In certain embodiments, the apparatus includes a processor that, in response to receiving the request message, attempts authentication with the user equipment; wherein, in response to successfully authenticating with the user equipment, the receiver receives a message comprising first location information corresponding to the user equipment.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
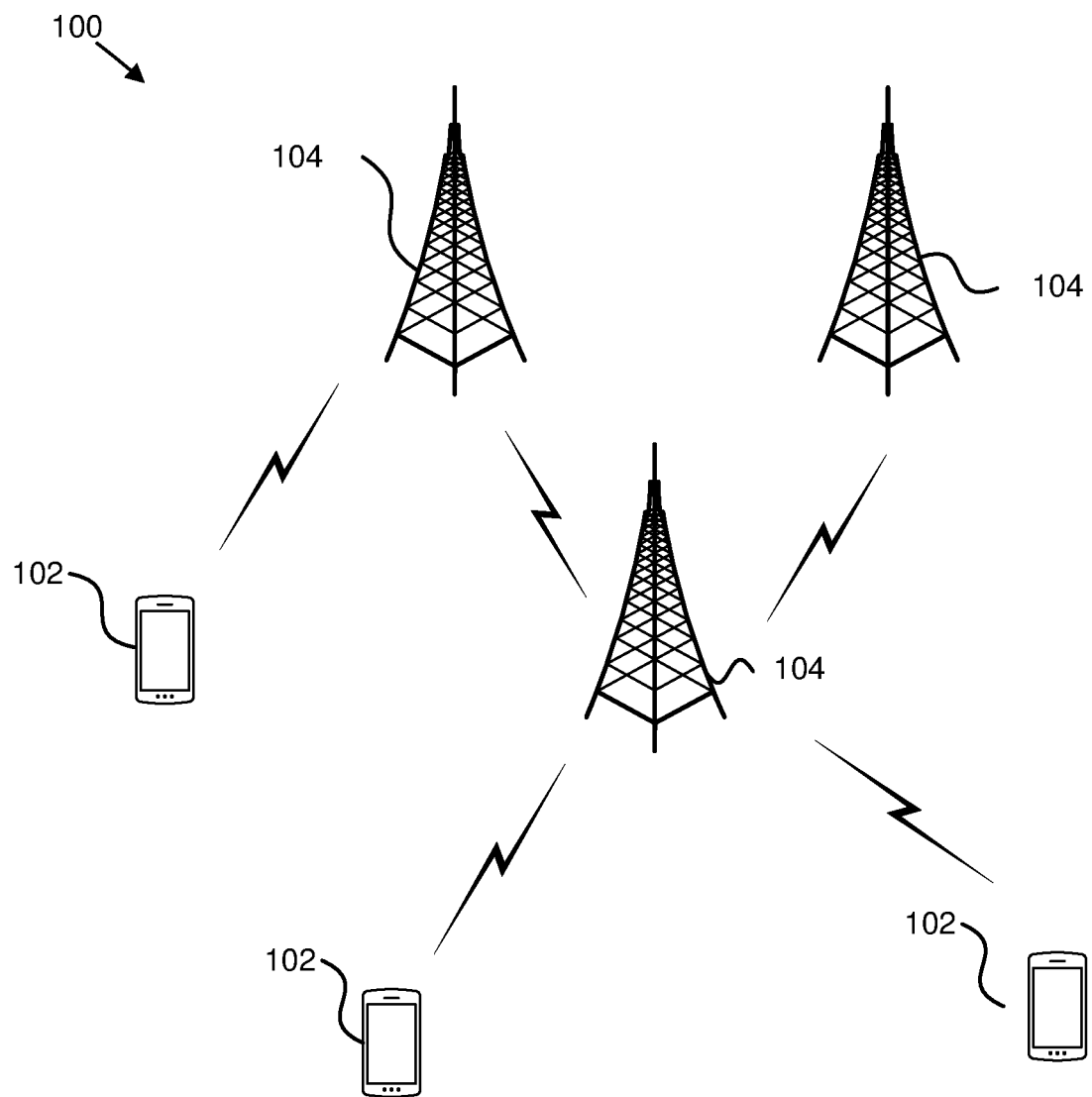
FIG. 1 is a schematic block diagram illustrating one embodiment of a wireless communication system for user equipment authentication.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for user equipment authentication. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, a radio access node, an AP, NR, a network entity, an AMF, a UDM, a UDR, a UDM/UDR, a PCF, a RAN, an NSSF, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, IEEE 802.11 variants, GSM, GPRS, UMTS, LTE variants, CDMA2000, Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In one embodiment, a remote unit 102 may transmit a request message to one or more network devices (e.g., network units 104). In some embodiments, the remote unit 102 may, in response to transmitting the request message, attempt authentication with the one or more network devices. In certain embodiments, the remote unit 102 may, in response to successfully authenticating with the one or more network devices, transmit a message comprising first location information corresponding to the remote unit 102 to the one or more network devices. Accordingly, the remote unit 102 may be used for user equipment authentication.

Figure 2:
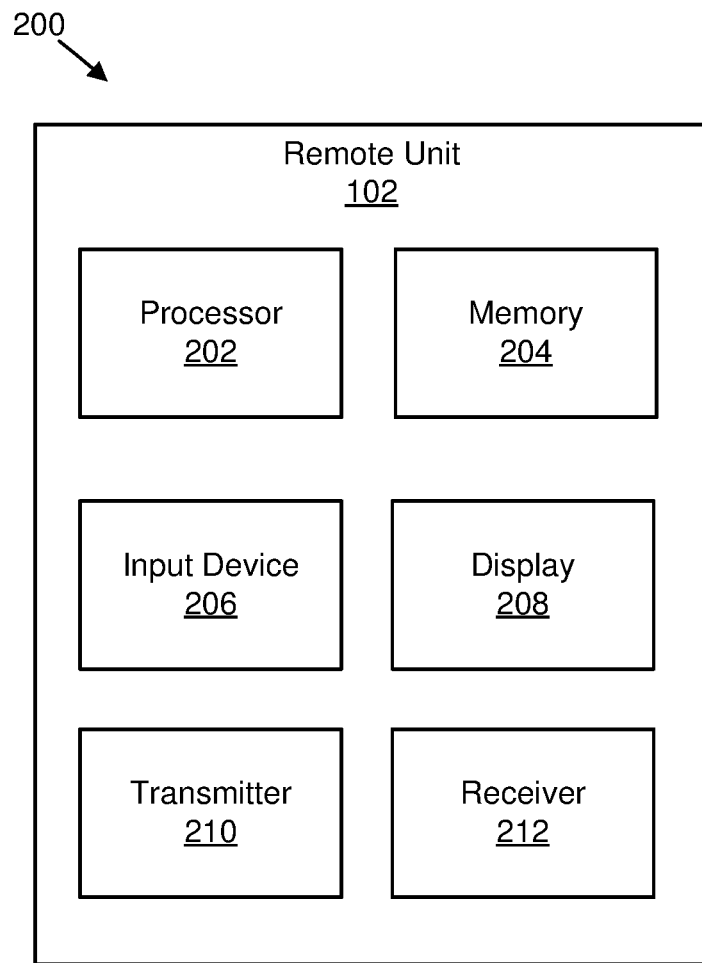
FIG. 2 is a schematic block diagram illustrating one embodiment of an apparatus that may be used for user equipment authentication.

FIG. 2 depicts one embodiment of an apparatus 200 that may be used for user equipment authentication. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In various embodiments, the processor 202 may, in response to transmitting a request message, attempt to authenticate with one or more network devices. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104, as described herein.

In some embodiments, the transmitter 210 may: transmit a request message to one or more network devices; and, in response to successfully authenticating with the one or more network devices, transmit a message comprising first location information corresponding to the remote unit 102 to the one or more network devices. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
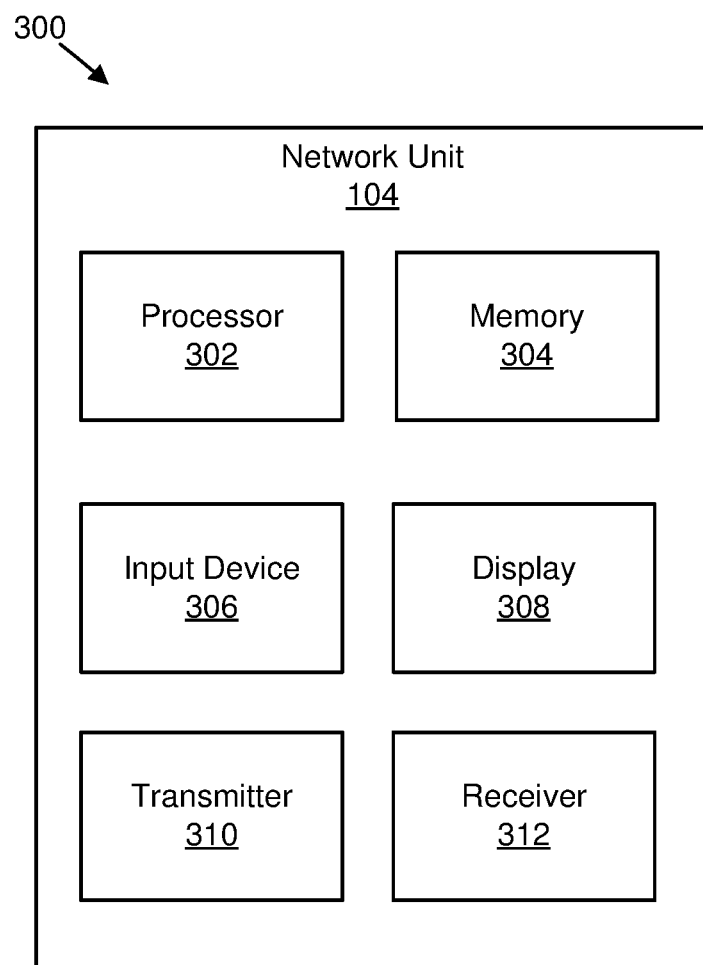
FIG. 3 is a schematic block diagram illustrating one embodiment of an apparatus that may be used for user equipment authentication.

FIG. 3 depicts one embodiment of an apparatus 300 that may be used for user equipment authentication. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the receiver 312 may receive a request message from a user equipment (e.g., remote unit 102). In certain embodiments, the processor 302 may, in response to receiving the request message, attempt authentication with the user equipment. In various embodiments, the receiver 312 may, in response to successfully authenticating with the user equipment, receive a message comprising first location information corresponding to the user equipment. Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
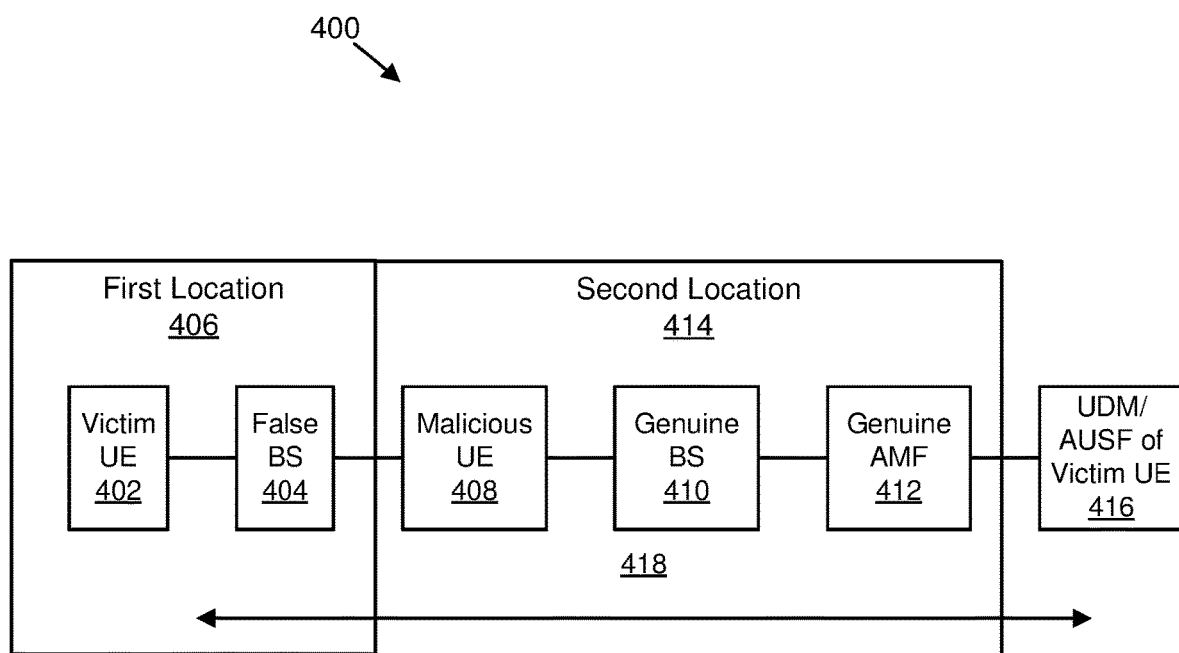
FIG. 4 is a schematic block diagram illustrating one embodiment of an authentication relay attack.

FIG. 4 is a schematic block diagram 400 illustrating one embodiment of an authentication relay attack. The diagram 400 includes a victim UE 402 and a false BS 404 both located at a first location 406, and a malicious UE 408, a genuine BS 410, a genuine AMF 412 all located at a second location 414. The diagram 400 also includes a UDM/AUSF of victim UE 416. The diagram 400 illustrates an authentication attack 418 that occurs across the devices.

In certain configurations, the victim UE 402 may be attracted to the false BS 404 (e.g., malicious gNB). In such configurations, the false BS 404 may collaborate with the malicious UE 408. Moreover, there may be a private channel between the false BS 404 and the malicious UE 408. In these configurations, the distance between the false BS 404 and the malicious UE 408 may be very far, and the false BS 404 and the malicious UE 408 may be linked by a LAN or a WAN to form a malicious network through two PLMNs.

In various embodiments, the victim UE 402 may perform a registration request, a service request, or a TAU request procedure. In such embodiments, the false BS 404 may forward a message of the victim UE 402 to the malicious UE 408, and the malicious UE 408 may forward the message to the genuine AMF 412 in a home network through the genuine BS 410 (e.g., remote legitimate gNB). If the AMF 412 initiates an authentication procedure, the false BS 404 and the malicious UE may forward the authentication messages between the remote legitimate gNB and the victim UE 402 to complete authentication. Accordingly, the victim UE 402 may successfully access the genuine BS 410 and register to the home network through the false BS 404 and the malicious UE 408.

In certain embodiments, a network-aware user's location and a user's actual location may be inconsistent. For example, if the user is in London, the attacker forwards the message to the genuine BS 410 located in New York through the false BS 404 and the malicious UE 408, so that the core network considers the user located in New York, providing a way to set up a false alibi or undermine a criminal investigation with false evidence. The victim UE 402 may be directed by an attacker to access the roaming network resulting in a charging fraud.

Unlike a typical man-in-the-middle attack, the adversary in this attack can neither decrypt the encrypted traffic between the victim UE 402 and the core networks, nor can inject valid encrypted traffic unless the service provider blatantly disregards the standard's security recommendations and choose a weak-security context and/or no-security context during connection establishment.

In certain embodiments, the genuine AMF 412 does not store actual location information of a UE, but the location information may be reported by a gNB. Once the UE accesses a malicious gNB, and the attacker adopts an authentication relay attack as described above, an AMF saved current location information of the UE and actual UE location information may be inconsistent, resulting in incorrect location positioning of the UE.

In various embodiments, there may not be a way to: 1) determine at a UE or an AMF that a malicious attack is occurring; or 2) inform the UE and the AMF about an ongoing malicious attack.

As found herein, the term BS may be used for a base station but may also be replaceable by any other radio access node (e.g., BS, eNB, gNB, AP, NR, and so forth). Moreover, embodiments described herein may be applicable also to various types of networks including IEEE 802.11 variants, GSM, GPRS, UMTS, LTE variants, CDMA 2000, Bluetooth, ZigBee, Sigfoxx, and so forth.

In a first embodiment, a victim UE may only be detected in the victim UE's HPLMN.

In the first embodiment, the victim UE would use a different 5G-GUTI (e.g., as UE ID in NAS signaling messages) than expected from an actual PLMN of a malicious UE. The malicious UE may filter out those identifiers or the NAS message may be encrypted with a current security context since the victim UE does not know that its message is rerouted to a different destination. This network based solution may look at the plausibility for the victim UE to change geographic locations within a time difference of a timestamp of the last known location in a UDM and a new location forced by the malicious UE.

Figure 5:
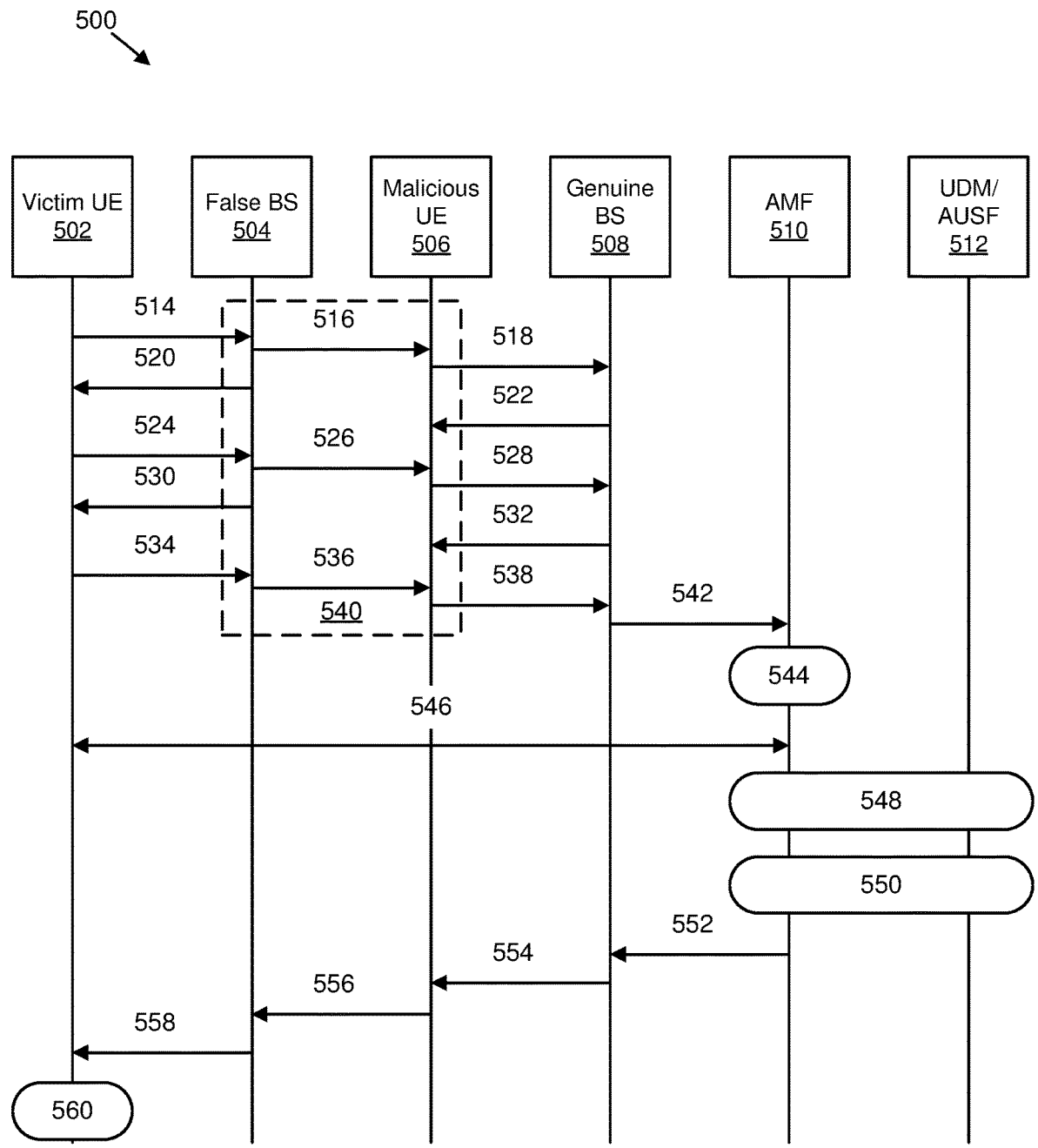
FIG. 5 is a schematic block diagram illustrating one embodiment of network communications.

FIG. 5 is a schematic block diagram illustrating network communications 500 for the first embodiment. The illustrated communications 500 are between a victim UE 502, a false BS 504, a malicious UE 506, a genuine BS 508, an AMF 510, and a UDM/AUSF 512. The victim UE 502 and the false BS 504 are located at the same general location in a first PLMN, and the malicious UE 506, the genuine BS 508, and the AMF 510 are located at the same general location in a second PLMN. Each of the communications 500 described herein may include one or more messages.

In one embodiment, in a first communication 514 transmitted from the victim UE 502 to the false BS 504, the victim UE 502 transmits a random access preamble to the false BS 504.

In another embodiment, in a second communication 516 transmitted from the false BS 504 to the malicious UE 506, the false BS 504 transmits a message that triggers the malicious UE 506 to the malicious UE 506.

In certain embodiments, in a third communication 518 transmitted from the malicious UE 506 to the genuine BS 508, the malicious UE 506 transmits a random access preamble to the genuine BS 508.

In some embodiments, in a fourth communication 520 transmitted from the false BS 504 to the victim UE 502, the false BS 504 transmits a random access response to the victim UE 502.

In one embodiment, in a fifth communication 522 transmitted from the genuine BS 508 to the malicious UE 506, the genuine BS 508 transmits a random access response to the malicious UE 506.

In another embodiment, in a sixth communication 524 transmitted from the victim UE 502 to the false BS 504, the victim UE 502 transmits an RRC setup request to the false BS 504.

In certain embodiments, in a seventh communication 526 transmitted from the false BS 504 to the malicious UE 506, the false BS 504 transmits a message that includes NG-5G-S-TMSI to the malicious UE 506.

In some embodiments, in an eighth communication 528 transmitted from the malicious UE 506 to the genuine BS 508, the malicious UE 506 transmits an RRC setup request to the genuine BS 508.

In one embodiment, in a ninth communication 530 transmitted from the false BS 504 to the victim UE 502, the false BS 504 transmits an RRC setup response to the victim UE 502.

In another embodiment, in a tenth communication 532 transmitted from the genuine BS 508 to the malicious UE 506, the genuine BS 508 transmits an RRC setup response to the malicious UE 506.

In certain embodiments, in an eleventh communication 534 transmitted from the victim UE 502 to the false BS 504, the victim UE 502 transmits an RRC setup complete message (e.g., NAS message) to the false BS 504.

In some embodiments, in a twelfth communication 536 transmitted from the false BS 504 to the malicious UE 506, the false BS 504 transmits an NAS message to the malicious UE 506.

In one embodiment, in a thirteenth communication 538 transmitted from the malicious UE 506 to the genuine BS 508, the malicious UE 506 transmits an RRC setup complete message to the genuine BS 508.

In various embodiments, the second communication 516, the seventh communication 526, and the twelfth communication 536 may all be assumed communications 540 that are transmitted from the false BS 504 to the malicious UE 506.

As may be appreciated, in one example, the communications described above may be for an NAS registration procedure triggered by the victim UE 502 and/or an RRC connection establishment procedure between the victim UE 502 and the false BS 504 concatenated with an RRC connection establishment procedure between the malicious UE 506 and the genuine BS 508. In certain embodiments, it is possible that the false BS 504 triggers the malicious UE 506 to establish a connection with the genuine BS 508. For example, the false BS 504 may use the second communication 516 to trigger the malicious UE 506 and/or the false BS 504 may use the twelfth communication 536 to carrying the victim UE's NAS message. As may be appreciated, the only information that the malicious UE 506 needs to perform a connection establishment with the second PLMN is the victim UE's NAS message.

Considering FIG. 5 as depicted, it may be assumed that during an RRC establishment procedure of communications 514 through 538, the victim UE 502 and the malicious UE 506 may act independently in different locations. The malicious UE 506 may be triggered with the random access preamble, the RRC setup request message, and/or the RRC setup complete message. In some embodiments, the malicious UE 506 may replace the victim UE's S-TMSI (e.g., NG-5G-S-TMSI) from the RRC setup request message in the sixth communication 524 with a malicious UE's S-TMSI in the form of a random string. It should be noted that an RRC layer may use a random string if there is no S-TMSI provided from upper layers (e.g., NAS layer).

As may be appreciated, the genuine BS 508 in the second PLMN and the HPLMN of the victim UE 502 (e.g., the UDM/AUSF 512) do not necessarily need to be the same.

In another embodiment, in a fourteenth communication 542 transmitted from the genuine BS 508 to the AMF 510, the genuine BS 508 transmits an initial NAS message to the AMF 510. The initial NAS message may include a 5G-GUTI of the first PLMN and/or may be integrity protected.

Once the AMF 510 in the second PLMN receives the initial NAS message forwarded from the malicious UE 506 in the fourteenth communication 542, the AMF 510 may determine 544 that there is no NAS context (e.g., security, access, and/or mobility context) corresponding to the 5G-GUTI, and the AMF 510 may determine that the 5G-GUTI contains a PLMN ID different from the PLMN ID of the second PLMN. The AMF 510 may not be able to check the integrity protection of the NAS message and may not be able to decipher an NAS container. The victim UE 502 may assume that it is in the same PLMN network that it started in. In certain embodiments, the victim UE 502 may send a message that has a complete initial NAS message ciphered in an NAS container along with cleartext IEs with whole message integrity protected. This initial NAS message may be a service request, a periodic reregistration message, a mobility reregistration message, and/or another message. If the victim UE 502 would perform PLMN selection (e.g., due to roaming), then the victim UE 502 may send SUCI in an unprotected initial NAS message since it does not have a security context and a valid 5G-GUTI assigned from the PLMN where the victim UE 502 camps. This may be used as a first indication of an authentication relay attack.

If the message received by the AMF 510 is a service request or a registration request, the AMF 510 may reject the request because the victim UE 502 is unknown in the network. The victim UE 502 itself may then initiate an initial registration request with its SUCI and UE capabilities. The victim UE 502 may use this as a criteria to recognize the false BS 504 because the victim UE 502 assumes it already has had a successful registration with the current PLMN, replayed by the false BS 504.

In certain embodiments, in a fifteenth communication 546 transmitted from the AMF 510 to the victim UE 502, the AMF 510 of the second PLMN does not know the identity of the victim UE 502, therefore the AMF 510 transmits an identity request to the victim UE 502 and requests SUCI. The identity request is forwarded to the victim UE 502 and the victim UE 502 provides its SUCI to the AMF 510 in an identity reply message.

In various embodiments, in a sixteenth communication 548 transmitted between the AMF 510 and the UDM/AUSF 512, the AMF 510 sends a Nausf_UEAuthentication_Authenticate request message to the UDM/AUSF 512 of the HPLMN of the victim UE 502. This request message contains the serving network identifier (e.g., identifier of the second PLMN). To provide the HPLMN with extra location information, the AMF 510 may send the location of the victim UE 502 according to GAD. This information may help the HPLMN to identify a distance between a location of a last registration in the UDM/AUSF 512 and the new location from the AMF 510, as well as the time difference.

In some embodiments, in a seventeenth communication 550 transmitted between the AMF 510 and the UDM/AUSF 512, the UDM/AUSF 512 may make a plausibility check to determine whether it is possible to travel from the last known location to the new location within the time that the present registration request occurred. If implemented in the HPLMN, then the HPLMN may deny the authentication request to the AMF 510 with a location mismatch cause value. Alternatively, the UDM/AUSF 512 may provide the last known location of the victim UE 502 including timestamp to the AMF 510 using GAD, and the AMF 510 may make the decision about whether the location differences between the first PLMN and the second PLMN are possible based on corresponding timestamps. This check may be performed in roaming scenarios based on PLMN IDs and in non-roaming scenarios based on tracking area IDs or global cell IDs.

In one embodiment, in an eighteenth communication 552 transmitted from the AMF 510 to the genuine BS 508, the AMF 510 may send a registration reject message to the genuine BS 508 with a cause that a PLMN, TAI, and/or cell ID mismatch occurred.

In certain embodiments, in a nineteenth communication 554 transmitted from the genuine BS 508 to the malicious UE 506, the genuine BS 508 may send the registration reject message to the malicious UE 506 with the cause that the PLMN, TAI, and/or cell ID mismatch occurred. In various embodiments, the malicious UE 506 may filter out this message and stop its retransmission.

In some embodiments, in a twentieth communication 556 transmitted from the malicious UE 506 to the false BS 504, the malicious UE 506 may send the registration reject message to the false BS 504 with the cause that the PLMN, TAI, and/or cell ID mismatch occurred. In some embodiments, the false BS 504 may filter out this message and stop its retransmission.

In various embodiments, in a twenty-first communication 558 transmitted from the false BS 504 to the victim UE 502, the false BS 504 may send the registration reject message to the victim UE 502 with the cause that the PLMN, TAI, and/or cell ID mismatch occurred.

If the victim UE 502 receives the registration reject message, the victim UE 502 may detect 560 that it is communicating with a false BS 504 and may trigger a cell reselection to establish communications with a genuine BS in the first PLMN.

A second embodiment may be based on a security mode command procedure that involves a victim UE, while the first embodiment may be a pure network based solution.

Figure 6:
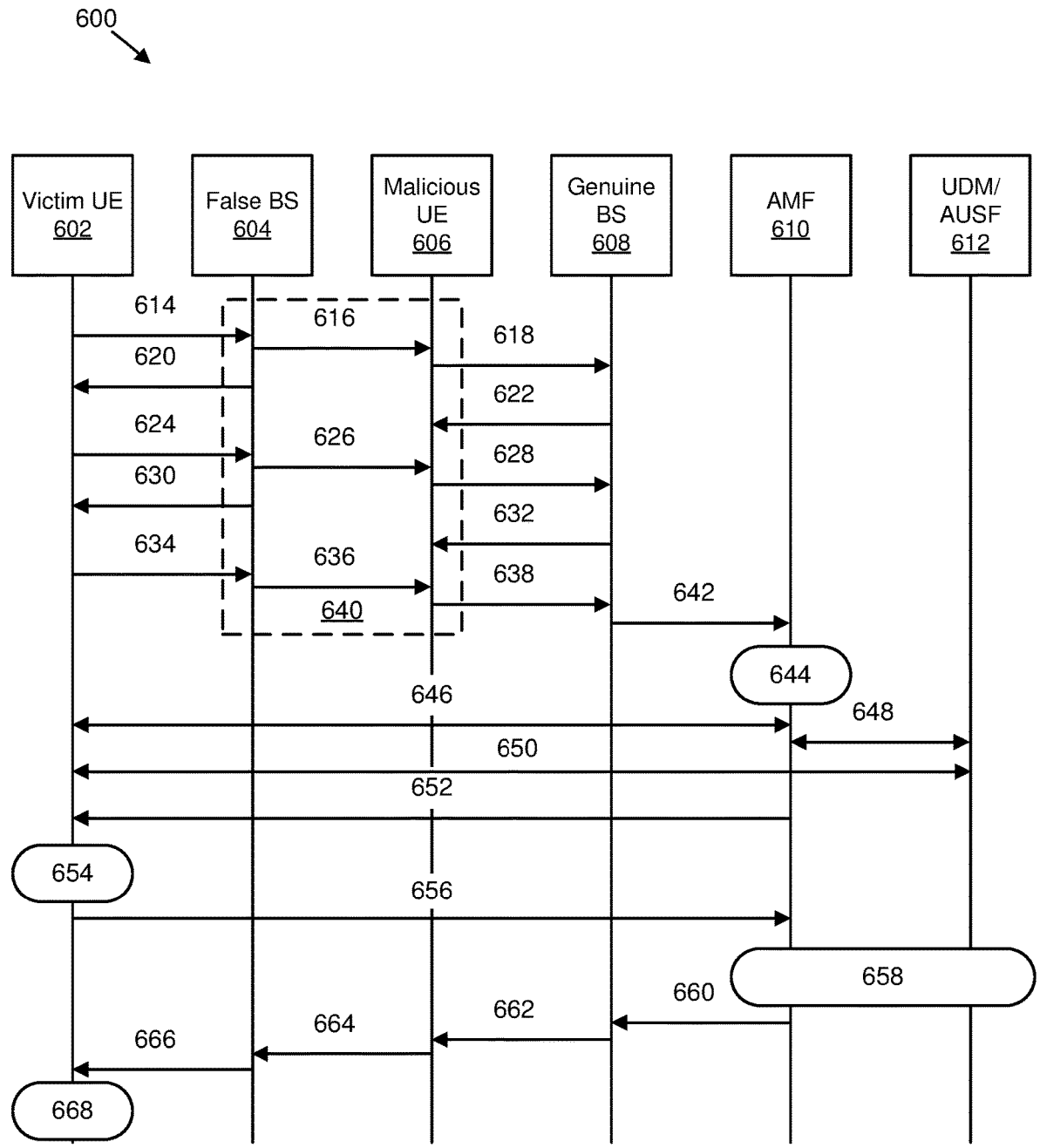
FIG. 6 is a schematic block diagram illustrating another embodiment of network communications.

FIG. 6 is a schematic block diagram illustrating network communications 600 for the second embodiment. The illustrated communications 600 are between a victim UE 602, a false BS 604, a malicious UE 606, a genuine BS 608, an AMF 610, and a UDM/AUSF 612. The victim UE 602 and the false BS 604 are located at the same general location in a first PLMN, and the malicious UE 606, the genuine BS 608, and the AMF 610 are located at the same general location in a second PLMN. Each of the communications 600 described herein may include one or more messages.

In one embodiment, in a first communication 614 transmitted from the victim UE 602 to the false BS 604, the victim UE 602 transmits a random access preamble to the false BS 604.

In another embodiment, in a second communication 616 transmitted from the false BS 604 to the malicious UE 606, the false BS 604 transmits a message that triggers the malicious UE 606 to the malicious UE 606.

In certain embodiments, in a third communication 618 transmitted from the malicious UE 606 to the genuine BS 608, the malicious UE 606 transmits a random access preamble to the genuine BS 608.

In some embodiments, in a fourth communication 620 transmitted from the false BS 604 to the victim UE 602, the false BS 604 transmits a random access response to the victim UE 602.

In one embodiment, in a fifth communication 622 transmitted from the genuine BS 608 to the malicious UE 606, the genuine BS 608 transmits a random access response to the malicious UE 606.

In another embodiment, in a sixth communication 624 transmitted from the victim UE 602 to the false BS 604, the victim UE 602 transmits an RRC setup request to the false BS 604.

In certain embodiments, in a seventh communication 626 transmitted from the false BS 604 to the malicious UE 606, the false BS 604 transmits a message that includes NG-5G-S-TMSI to the malicious UE 606.

In some embodiments, in an eighth communication 628 transmitted from the malicious UE 606 to the genuine BS 608, the malicious UE 606 transmits an RRC setup request to the genuine BS 608.

In one embodiment, in a ninth communication 630 transmitted from the false BS 604 to the victim UE 602, the false BS 604 transmits an RRC setup response to the victim UE 602.

In another embodiment, in a tenth communication 632 transmitted from the genuine BS 608 to the malicious UE 606, the genuine BS 608 transmits an RRC setup response to the malicious UE 606.

In certain embodiments, in an eleventh communication 634 transmitted from the victim UE 602 to the false BS 604, the victim UE 602 transmits an RRC setup complete message (e.g., NAS message) to the false BS 604.

In some embodiments, in a twelfth communication 636 transmitted from the false BS 604 to the malicious UE 606, the false BS 604 transmits an NAS message to the malicious UE 606.

In one embodiment, in a thirteenth communication 638 transmitted from the malicious UE 606 to the genuine BS 608, the malicious UE 606 transmits an RRC setup complete message to the genuine BS 608.

In various embodiments, the second communication 616, the seventh communication 626, and the twelfth communication 636 may all be assumed communications 640 that are transmitted from the false BS 604 to the malicious UE 606.

As may be appreciated, in one example, the communications described above may be for an NAS registration procedure triggered by the victim UE 602 and/or an RRC connection establishment procedure between the victim UE 602 and the false BS 604 concatenated with an RRC connection establishment procedure between the malicious UE 606 and the genuine BS 608. In certain embodiments, it is possible that the false BS 604 triggers the malicious UE 606 to establish a connection with the genuine BS 608. For example, the false BS 604 may use the second communication 616 to trigger the malicious UE 606 and/or the false BS 604 may use the twelfth communication 636 to carrying the victim UE's NAS message. As may be appreciated, the only information that the malicious UE 606 needs to perform a connection establishment with the second PLMN is the victim UE's NAS message.

Considering FIG. 6 as depicted, it may be assumed that during an RRC establishment procedure of communications 614 through 638, the victim UE 602 and the malicious UE 606 may act independently in different locations. The malicious UE 606 may be triggered with the random access preamble, the RRC setup request message, and/or the RRC setup complete message. In some embodiments, the malicious UE 606 may replace the victim UE's S-TMSI (e.g., NG-5G-S-TMSI) from the RRC setup request message in the sixth communication 624 with a malicious UE's S-TMSI in the form of a random string. It should be noted that an RRC layer may use a random string if there is no S-TMSI provided from upper layers (e.g., NAS layer).

As may be appreciated, the genuine BS 608 in the second PLMN and the HPLMN of the victim UE 602 (e.g., the UDM/AUSF 612) do not necessarily need to be the same.

In another embodiment, in a fourteenth communication 642 transmitted from the genuine BS 608 to the AMF 610, the genuine BS 608 transmits an initial NAS message to the AMF 610. The initial NAS message may include a 5G-GUTI of the first PLMN and/or may be integrity protected.

Once the AMF 610 in the second PLMN receives the initial NAS message forwarded from the malicious UE 606 in the fourteenth communication 642, the AMF 610 may determine 644 that there is no NAS context (e.g., security, access, and/or mobility context) corresponding to the 5G-GUTI, and the AMF 610 may determine that the 5G-GUTI contains a PLMN ID different from the PLMN ID of the second PLMN. The AMF 610 may not be able to check the integrity protection of the NAS message and may not be able to decipher an NAS container. The victim UE 602 may assume that it is in the same PLMN network that it started in. In certain embodiments, the victim UE 602 may send a message that has a complete initial NAS message ciphered in an NAS container along with cleartext IEs with whole message integrity protected. This initial NAS message may be a service request, a periodic reregistration message, a mobility reregistration message, and/or another message. If the victim UE 602 would perform PLMN selection (e.g., due to roaming), then the victim UE 602 may send SUCI in an unprotected initial NAS message since it does not have a security context and a valid 5G-GUTI assigned from the PLMN where the victim UE 602 camps. This may be used as a first indication of an authentication relay attack.

If the message received by the AMF 610 is a service request or a registration request, the AMF 610 may reject the request because the victim UE 602 is unknown in the network. The victim UE 602 itself may then initiate an initial registration request with its SUCI and UE capabilities. The victim UE 602 may use this as a criteria to recognize the false BS 604 because the victim UE 602 assumes it already has had a successful registration with the current PLMN, replayed by the false BS 604.

In certain embodiments, in a fifteenth communication 646 transmitted from the AMF 610 to the victim UE 602, the AMF 610 of the second PLMN does not know the identity of the victim UE 602, therefore the AMF 610 transmits an identity request to the victim UE 602 and requests SUCI. The identity request is forwarded to the victim UE 602 and the victim UE 602 provides its SUCI to the AMF 610 in an identity reply message.

In various embodiments, in a sixteenth communication 648 transmitted between the AMF 610 and the UDM/AUSF 612, the AMF 610 sends a Nausf_UEAuthentication_Authenticate request message to the UDM/AUSF 612 of the HPLMN of the victim UE 602. This request message contains the serving network identifier (e.g., identifier of the second PLMN). To provide the HPLMN with extra location information, the AMF 610 may send the location of the victim UE 602 according to GAD. This information may help the HPLMN to identify a distance between a location of a last registration in the UDM/AUSF 612 and the new location from the AMF 610, as well as the time difference.

The UDM/AUSF 612 may make a plausibility check to determine whether it is possible to travel from the last known location to the new location within the time that the present registration request occurred. If implemented in the HPLMN, then the HPLMN may deny the authentication request to the AMF 610 with a location mismatch cause value. Alternatively, the UDM/AUSF 612 may provide the last known location of the victim UE 602 including timestamp to the AMF 610 using GAD, and the AMF 610 may make the decision about whether the location differences between the first PLMN and the second PLMN are possible based on corresponding timestamps. This check may be performed in roaming scenarios based on PLMN IDs and in non-roaming scenarios based on tracking area IDs or global cell IDs.

In some embodiments, in a seventeenth communication 650 transmitted between the victim UE 602 and the UDM/AUSF 612, if a location check is not performed in UDM/AUSF 612 or the AMF 610 and the AMF 610 does not reject the NAS message, the UDM/AUSF 612 would normally provide an authentication challenge back to the AMF 610 and performs normal primary authentication with the victim UE 602.

In certain embodiments, in an eighteenth communication 652 transmitted from the AMF 610 to the victim UE 602, after successful authentication, the AMF 610 sends a security mode command message to the victim UE 602. The security mode command (e.g., NAS security mode command) may be integrity protected (e.g., but not ciphered) with a NAS integrity key based on a $K_{AMF}$ indicated by a ngKSI in the NAS security mode command message. This may mean that the AMF 610 includes information about the current network as well and the AMF 610 including its PLMN ID, TAI, GCID, and/or location information using GAD from where the malicious UE 606 sent requests.

Because the security mode command message is integrity protected, the victim UE 602 may directly recognize 654 if the malicious UE 606 or the false BS 604 would try to modify location and/or serving network information. The victim UE 602 may detect that it is not connected to the PLMN it thinks it is connected to (e.g., detect different PLMN ID and/or TAI in the security mode command message). The victim UE 602 may create an error response message and may collect additional information for the network for detecting the false BS 604 in the first PLMN (e.g., a measurement report).

In various embodiments, in a nineteenth communication 656 transmitted from the victim UE 602 to the AMF 610, the victim UE 602 sends a ciphered security mode complete message including an error cause of a location mismatch (e.g., PLMN ID mismatch, TAI mismatch, GCID, measurement report, and/or location information using GAD). The security mode complete message may have additional information like PLMN ID, TAI, measurement report for guiding the network to find the false BS 604 location, and so forth.

The AMF 610 may detect 658 the victims UE's location mismatch. The AMF 610 may inform an OAM system for additional steps for detecting the false BS 604 and/or the malicious UE 606 locations. The AMF 610 may forward the additional information received from the victim UE 602 to the OAM system and may inform the UDM/AUSF 612 about the location mismatch.

In one embodiment, in a twentieth communication 660 transmitted from the AMF 610 to the genuine BS 608, the AMF 610 may send a registration reject message to the genuine BS 608 with a cause that a PLMN, TAI, cell ID, and/or GAD mismatch occurred. The message may be ciphered and/or integrity protected.

In certain embodiments, in a twenty-first communication 662 transmitted from the genuine BS 608 to the malicious UE 606, the genuine BS 608 may send the registration reject message to the malicious UE 606 with the cause that the PLMN, TAI, cell ID, and/or GAD mismatch occurred. The message may be ciphered and/or integrity protected. In various embodiments, the malicious UE 606 may filter out this message and stop its retransmission.

In some embodiments, in a twenty-second communication 664 transmitted from the malicious UE 606 to the false BS 604, the malicious UE 606 may send the registration reject message to the false BS 604 with the cause that the PLMN, TAI, cell ID, and/or GAD mismatch occurred. The message may be ciphered and/or integrity protected. In some embodiments, the false BS 604 may filter out this message and stop its retransmission.

In various embodiments, in a twenty-third communication 666 transmitted from the false BS 604 to the victim UE 602, the false BS 604 may send the registration reject message to the victim UE 602 with the cause that the PLMN, TAI, cell ID, and/or GAD mismatch occurred. The message may be ciphered and/or integrity protected.

If the victim UE 602 receives the registration reject message, the victim UE 602 may detect 668 that it is communicating with a false BS 604 and may trigger a cell reselection to establish communications with a genuine BS in the first PLMN.

A third embodiment is shown for simplicity for one PLMN only, but may not be limited to on PLMN. For example, the third embodiment may apply if a malicious UE is in a different PLMN as well if a UDM/AUSF is in an additional different PLMN (e.g., HPLMN).

Figure 7:
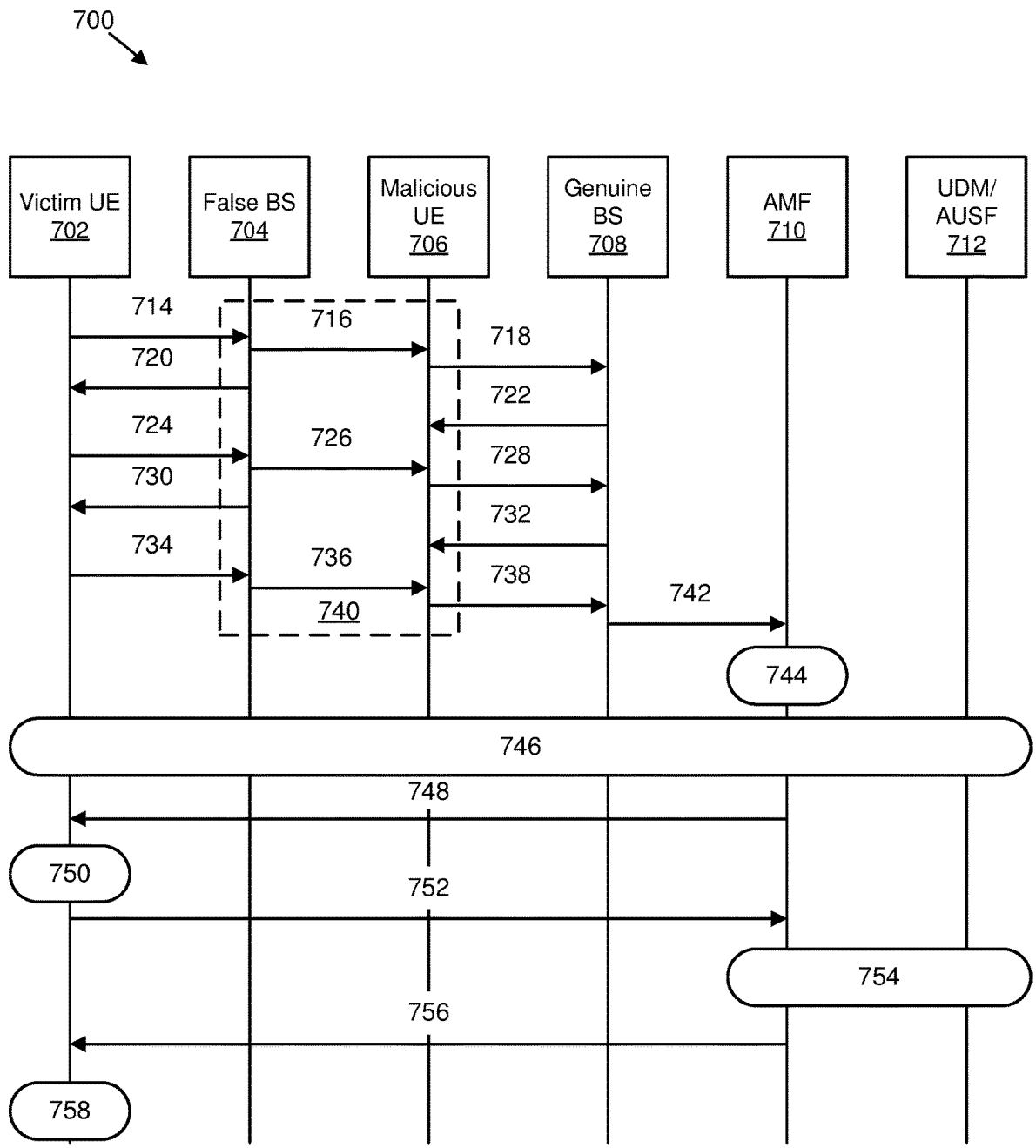
FIG. 7 is a schematic block diagram illustrating a further embodiment of network communications.

FIG. 7 is a schematic block diagram illustrating network communications 700 for the third embodiment. The illustrated communications 700 are between a victim UE 702, a false BS 704, a malicious UE 706, a genuine BS 708, an AMF 710, and a UDM/AUSF 712. The victim UE 702, the false BS 704, the malicious UE 706, the genuine BS 708, the AMF 710, and the UDM/AUSF 712 are located at the same general location in a HPLMN of the victim UE 702. Each of the communications 700 described herein may include one or more messages.

In one embodiment, in a first communication 714 transmitted from the victim UE 702 to the false BS 704, the victim UE 702 transmits a random access preamble to the false BS 704.

In another embodiment, in a second communication 716 transmitted from the false BS 704 to the malicious UE 706, the false BS 704 transmits a message that triggers the malicious UE 706 to the malicious UE 706.

In certain embodiments, in a third communication 718 transmitted from the malicious UE 706 to the genuine BS 708, the malicious UE 706 transmits a random access preamble to the genuine BS 708.

In some embodiments, in a fourth communication 720 transmitted from the false BS 704 to the victim UE 702, the false BS 704 transmits a random access response to the victim UE 702.

In one embodiment, in a fifth communication 722 transmitted from the genuine BS 708 to the malicious UE 706, the genuine BS 708 transmits a random access response to the malicious UE 706.

In another embodiment, in a sixth communication 724 transmitted from the victim UE 702 to the false BS 704, the victim UE 702 transmits an RRC setup request to the false BS 704.

In certain embodiments, in a seventh communication 726 transmitted from the false BS 704 to the malicious UE 706, the false BS 704 transmits a message that includes NG-5G-S-TMSI to the malicious UE 706.

In some embodiments, in an eighth communication 728 transmitted from the malicious UE 706 to the genuine BS 708, the malicious UE 706 transmits an RRC setup request to the genuine BS 708.

In one embodiment, in a ninth communication 730 transmitted from the false BS 704 to the victim UE 702, the false BS 704 transmits an RRC setup response to the victim UE 702.

In another embodiment, in a tenth communication 732 transmitted from the genuine BS 708 to the malicious UE 706, the genuine BS 708 transmits an RRC setup response to the malicious UE 706.

In certain embodiments, in an eleventh communication 734 transmitted from the victim UE 702 to the false BS 704, the victim UE 702 transmits an RRC setup complete message (e.g., NAS message) to the false BS 704.

In some embodiments, in a twelfth communication 736 transmitted from the false BS 704 to the malicious UE 706, the false BS 704 transmits an NAS message to the malicious UE 706.

In one embodiment, in a thirteenth communication 738 transmitted from the malicious UE 706 to the genuine BS 708, the malicious UE 706 transmits an RRC setup complete message to the genuine BS 708.

In various embodiments, the second communication 716, the seventh communication 726, and the twelfth communication 736 may all be assumed communications 740 that are transmitted from the false BS 704 to the malicious UE 706.

As may be appreciated, in one example, the communications described above may be for an NAS registration procedure triggered by the victim UE 702 and/or an RRC connection establishment procedure between the victim UE 702 and the false BS 704 concatenated with an RRC connection establishment procedure between the malicious UE 706 and the genuine BS 708. In certain embodiments, it is possible that the false BS 704 triggers the malicious UE 706 to establish a connection with the genuine BS 708. For example, the false BS 704 may use the second communication 716 to trigger the malicious UE 706 and/or the false BS 704 may use the twelfth communication 736 to carrying the victim UE's NAS message. As may be appreciated, the only information that the malicious UE 706 needs to perform a connection establishment with the HPLMN is the victim UE's NAS message.

The malicious UE 706 may be triggered with the random access preamble, the RRC setup request message, and/or the RRC setup complete message. In some embodiments, the malicious UE 706 may replace the victim UE's S-TMSI (e.g., NG-5G-S-TMSI) from the RRC setup request message in the sixth communication 724 with a malicious UE's S-TMSI in the form of a random string. It should be noted that an RRC layer may use a random string if there is no S-TMSI provided from upper layers (e.g., NAS layer).

In another embodiment, in a fourteenth communication 742 transmitted from the genuine BS 708 to the AMF 710, the genuine BS 708 transmits an initial NAS message to the AMF 710. The initial NAS message may include a 5G-GUTI of the first PLMN and/or may be integrity protected.

Once the AMF 710 in the second PLMN receives the initial NAS message forwarded from the malicious UE 706 in the fourteenth communication 742, the AMF 710 may determine 744 that there is no NAS context (e.g., security, access, and/or mobility context) corresponding to the 5G-GUTI, and the AMF 710 may determine that the 5G-GUTI contains a PLMN ID different from the PLMN ID of the second PLMN. The AMF 710 may not be able to check the integrity protection of the NAS message and may not be able to decipher an NAS container. The victim UE 702 may assume that it is in the same PLMN network that it started in. In certain embodiments, the victim UE 702 may send a message that has a complete initial NAS message ciphered in an NAS container along with cleartext IEs with whole message integrity protected. This initial NAS message may be a service request, a periodic reregistration message, a mobility reregistration message, and/or another message. If the victim UE 702 would perform PLMN selection (e.g., due to roaming), then the victim UE 702 may send SUCI in an unprotected initial NAS message since it does not have a security context and a valid 5G-GUTI assigned from the PLMN where the victim UE 702 camps. This may be used as a first indication of an authentication relay attack.

If the message received by the AMF 710 is a service request or a registration request, the AMF 710 may reject the request because the victim UE 702 is unknown in the network. The victim UE 702 itself may then initiate an initial registration request with its SUCI and UE capabilities. The victim UE 702 may use this as a criteria to recognize the false BS 704 because the victim UE 702 assumes it already has had a successful registration with the current PLMN, replayed by the false BS 704.

In certain embodiments, in a fifteenth communication 746 transmitted between the victim UE 702 and the UDM/AUSF 712, authentication may be performed and a security mode command message and/or security mode command response message may be transmitted.

In one embodiment, in a sixteenth communication 748 transmitted from the AMF 710 to the victim UE 702, the AMF 710 may send a registration accept message to the victim UE 702. The registration accept message already may contain a GAD, a 5G-GUTI, a PLMN ID, a TAI, and/or a cell ID from which the AMF 710 received messages from the genuine BS 708.

The victim UE 702 may compare 750 the GAD, the 5G-GUTI, the PLMN ID, the TAI, and/or the Cell ID with the information corresponding to wherein the victim UE 702 is camped and may detect that they are not overlapping with an MIB of the false BS 704 (e.g., detect that the false BS 704 is a false BS). To inform the network that it detected the false BS 704, the victim UE 702 may create an error report and may collect additional information (e.g., a measurement report) to guide the network in finding a location of the false BS 704.

In various embodiments, in a seventeenth communication 752 transmitted from the victim UE 702 to the AMF 710, after the victim UE 702 has detected the mismatch between the 5G-GUTI's, the PLMN ID, the TAI, the cell ID, and/or the GAD, and the current victim UE's location PLMN ID, TAI, cell ID, and/or GAD, the victim UE 702 may trigger a deregistration procedure because the victim UE 702 may want to select another PLMN or another cell. The victim UE 702 may send an NAS deregistration request message with an indication about the detected false BS 704 and/or location of the false BS 704. The NAS deregistration request message may include a PLMN ID, a TAI, a cell ID, a measurement report, and/or a GAD to facilitate indicating the mismatch and/or location information corresponding to the false BS 704.

The AMF 710 detects 754 the location mismatch. The AMF 710 may inform an OAM system with additional steps for detecting the false BS 704 and/or the malicious UE 706 locations. The AMF 710 may forward the additional information received from the victim UE 702 to the OAM system and may inform the UDM/AUSF 712 about the location mismatch.

In certain embodiments, in an eighteenth communication 756 transmitted from the AMF 710 to the victim UE 702, the AMF 710 may send a deregistration accept message (or any suitable NAS message) to the victim UE 702 with a cause that the PLMN, TAI, cell ID, and/or GAD location mismatch occurred. The deregistration accept message may be ciphered and/or integrity protected.

After the victim UE 702 receives the deregistration accept message, the victim UE 702 may trigger 758 a cell reselection procedure and/or a PLMN reselection procedure to establish communications with a genuine BS.

Figure 8:
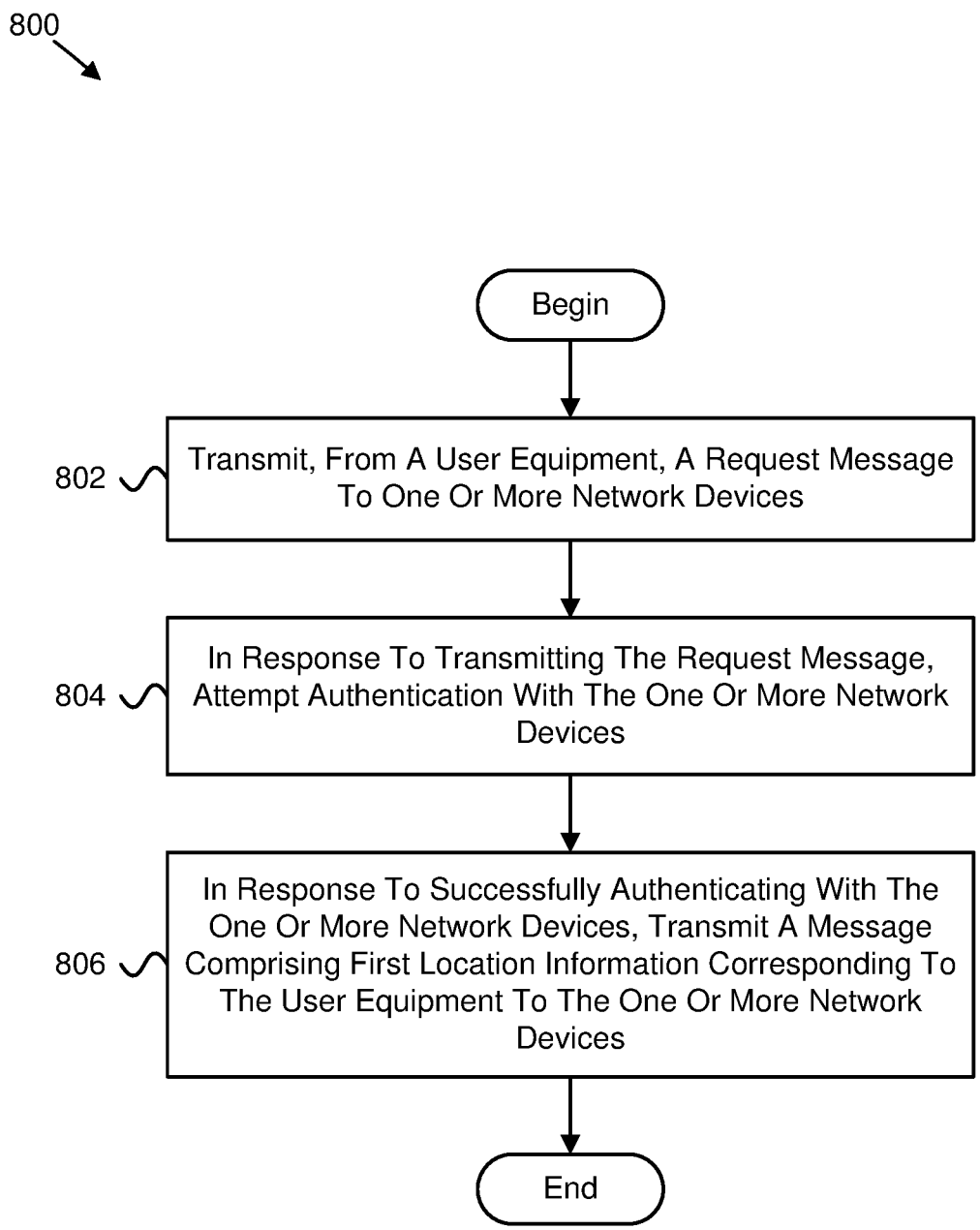
FIG. 8 is a flow chart diagram illustrating one embodiment of a method for user equipment authentication.

FIG. 8 is a flow chart diagram illustrating one embodiment of a method 800 for user equipment authentication. In some embodiments, the method 800 is performed by an apparatus, such as the remote unit 102. In certain embodiments, the method 800 may be performed by a processor executing program code, for example, a microcontroller, a microprocessor, a CPU, a GPU, an auxiliary processing unit, a FPGA, or the like.

The method 800 may include transmitting 802, from a user equipment, a request message to one or more network devices. In some embodiments, the method 800 includes, in response to transmitting the request message, attempting 804 authentication with the one or more network devices. In certain embodiments, the method 800 includes, in response to successfully authenticating with the one or more network devices, transmitting 806 a message comprising first location information corresponding to the user equipment to the one or more network devices.

In certain embodiments, the message is ciphered. In some embodiments, the message comprises a security mode complete message, a registration acceptance message, a deregistration request message, or some combination thereof. In various embodiments, the method 800 further comprises comparing the first location information from the message with second location information available in the user equipment.

In one embodiment, the method 800 further comprises detecting a false base station based on a location information mismatch. In certain embodiments, transmitting the message comprising the first location information comprises transmitting the message comprising the user equipment's location information to the one or more network devices. In some embodiments, the one or more network devices reject registration of the user equipment based on the first location information from the message.

In various embodiments, the method 800 further comprises receiving a registration rejection message in response to transmitting the message. In one embodiment, the method 800 further comprises receiving a security mode command message in response to successfully authenticating with the one or more network devices.

Figure 9:
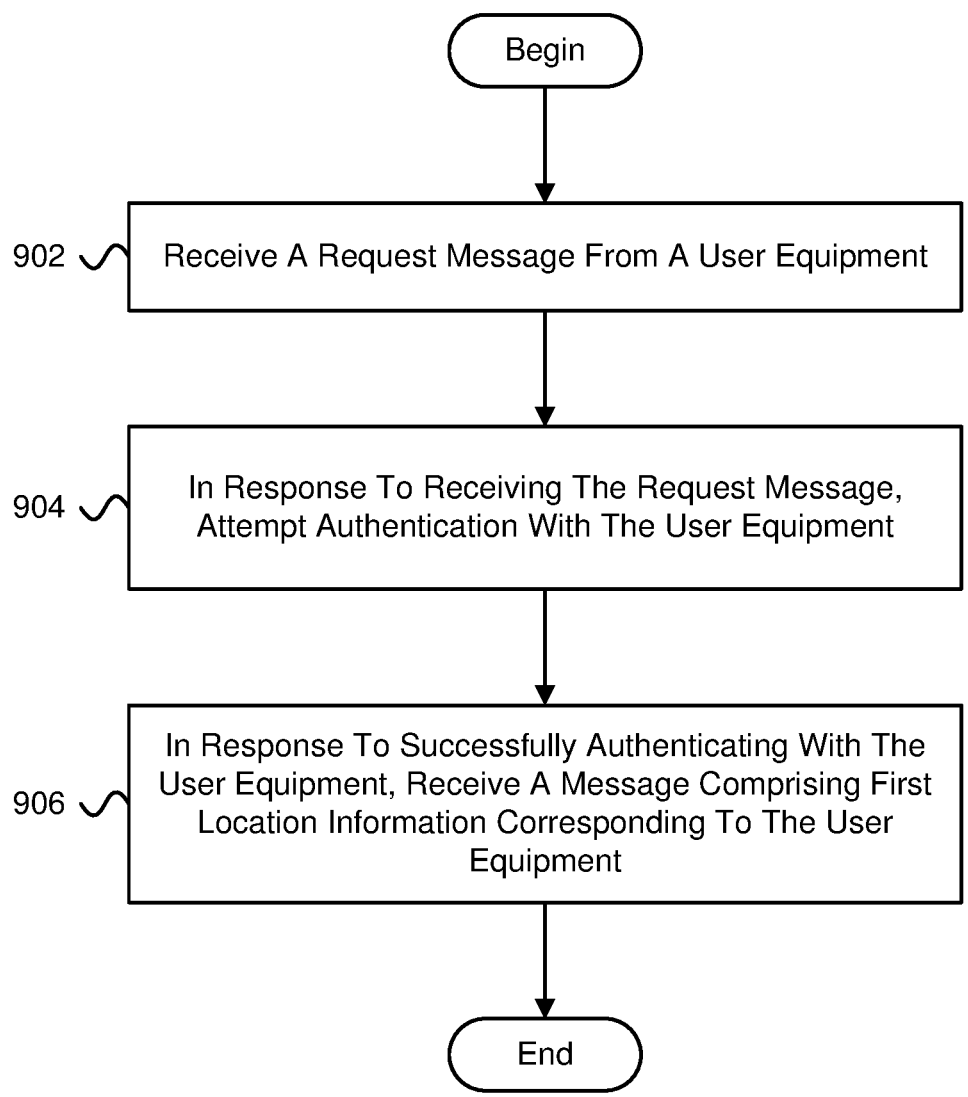
FIG. 9 is a flow chart diagram illustrating another embodiment of a method for user equipment authentication.

FIG. 9 is a flow chart diagram illustrating one embodiment of a method 900 for user equipment authentication. In some embodiments, the method 900 is performed by an apparatus, such as the network unit 104. In certain embodiments, the method 900 may be performed by a processor executing program code, for example, a microcontroller, a microprocessor, a CPU, a GPU, an auxiliary processing unit, a FPGA, or the like.

The method 900 may include receiving 902 a request message from a user equipment. In some embodiments, the method 900 includes, in response to receiving the request message, attempting 904 authentication with the user equipment. In certain embodiments, the method 900 includes, in response to successfully authenticating with the user equipment, receiving 906 a message comprising first location information corresponding to the user equipment.

In certain embodiments, the message is ciphered. In some embodiments, the message comprises a security mode complete message, a registration acceptance message, a deregistration request message, or some combination thereof. In various embodiments, the method 900 further comprises comparing the first location information from the message with second location information available in the user equipment.

In one embodiment, the method 900 further comprises detecting a false base station based on a location information mismatch. In certain embodiments, receiving the message comprising the first location information comprises receiving the message comprising the user equipment's location information. In some embodiments, the method 900 further comprises rejecting registration of the user equipment based on the first location information from the message.

In various embodiments, the method 900 further comprises transmitting a registration rejection message in response to receiving the message. In one embodiment, the method 900 further comprises transmitting a security mode command message in response to successfully authenticating the user equipment.

In one embodiment, a method comprises: transmitting, from a user equipment, a request message to one or more network devices; in response to transmitting the request message, attempting authentication with the one or more network devices; and in response to successfully authenticating with the one or more network devices, transmitting a message comprising first location information corresponding to the user equipment to the one or more network devices.

In certain embodiments, the message is ciphered.

In some embodiments, the message comprises a security mode complete message, a registration acceptance message, a deregistration request message, or some combination thereof.

In various embodiments, the method further comprises comparing the first location information from the message with second location information available in the user equipment.

In one embodiment, the method further comprises detecting a false base station based on a location information mismatch.

In certain embodiments, transmitting the message comprising the first location information comprises transmitting the message comprising the user equipment's location information to the one or more network devices.

In some embodiments, the one or more network devices reject registration of the user equipment based on the first location information from the message.

In various embodiments, the method further comprises receiving a registration rejection message in response to transmitting the message.

In one embodiment, the method further comprises receiving a security mode command message in response to successfully authenticating with the one or more network devices.

In one embodiment, an apparatus comprises: a transmitter that transmits a request message to one or more network devices; and a processor that, in response to transmitting the request message, attempts to authenticate with the one or more network devices; wherein, in response to successfully authenticating with the one or more network devices, the transmitter transmits a message comprising first location information corresponding to the apparatus to the one or more network devices.

In certain embodiments, the message is ciphered.

In some embodiments, the message comprises a security mode complete message, a registration acceptance message, a deregistration request message, or some combination thereof.

In various embodiments, the processor compares the first location information from the message with second location information available in the apparatus.

In one embodiment, the processor detects a false base station based on a location information mismatch.

In certain embodiments, the transmitter transmitting the message comprising the first location information comprises the transmitter transmitting the message comprising the apparatus' location information to the one or more network devices.

In some embodiments, the one or more network devices reject registration of the apparatus based on the first location information from the message.

In various embodiments, the apparatus further comprises a receiver that receives a registration rejection message in response to the transmitter transmitting the message.

In one embodiment, the apparatus further comprises a receiver that receives a security mode command message in response to the processor successfully authenticating with the one or more network devices.

In one embodiment, a method comprises: receiving a request message from a user equipment; in response to receiving the request message, attempting authentication with the user equipment; and in response to successfully authenticating with the user equipment, receiving a message comprising first location information corresponding to the user equipment.

In certain embodiments, the message is ciphered.

In some embodiments, the message comprises a security mode complete message, a registration acceptance message, a deregistration request message, or some combination thereof.

In various embodiments, the method further comprises comparing the first location information from the message with second location information available in the user equipment.

In one embodiment, the method further comprises detecting a false base station based on a location information mismatch.

In certain embodiments, receiving the message comprising the first location information comprises receiving the message comprising the user equipment's location information.

In some embodiments, the method further comprises rejecting registration of the user equipment based on the first location information from the message.

In various embodiments, the method further comprises transmitting a registration rejection message in response to receiving the message.

In one embodiment, the method further comprises transmitting a security mode command message in response to successfully authenticating the user equipment.

In one embodiment, an apparatus comprises: a receiver that receives a request message from a user equipment; and a processor that, in response to receiving the request message, attempts authentication with the user equipment; wherein, in response to successfully authenticating with the user equipment, the receiver receives a message comprising first location information corresponding to the user equipment.

In certain embodiments, the message is ciphered.

In some embodiments, the message comprises a security mode complete message, a registration acceptance message, a deregistration request message, or some combination thereof.

In various embodiments, the processor compares the first location information from the message with second location information available in the user equipment.

In one embodiment, the processor detects a false base station based on a location information mismatch.

In certain embodiments, the receiver receiving the message comprising the first location information comprises the receiver receiving the message comprising the user equipment's location information.

In some embodiments, the processor rejects registration of the user equipment based on the first location information from the message.

In various embodiments, the apparatus further comprises a transmitter that transmits a registration rejection message in response to the receiver receiving the message.

In one embodiment, the method further comprises a transmitter that transmits a security mode command message in response to the processor successfully authenticating the user equipment.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method at a user equipment to detect a false base station, the method comprising:
   transmitting, from the user equipment, a request message comprising a non-access stratum message to the false base station;
   in response to the transmitting the request message, attempting authentication with a unified data management (UDM), authentication server function (AUSF), or a combination thereof; and
   in response to successfully authenticating with the UDM, AUSF, or the combination thereof, transmitting a response message comprising first location information corresponding to the user equipment to an access and mobility management function (AMF) to enable the AMF to detect the false base station.

2. The method of claim 1, wherein the response message comprises a security mode complete message a deregistration request message, or a combination thereof.

3. The method of claim 1, further comprising comparing the first location information from the response message with second location information available in the user equipment, and detecting the false base station based on a location information mismatch, wherein the second location information available in the user equipment comprises location information received by the user equipment from one or more network devices and stored in the user equipment.

4. The method of claim 1, wherein transmitting the response message comprising the first location information comprises transmitting the response message comprising the location information indicating a location of the user equipment to one or more network devices.

5. The method of claim 1, further comprising receiving a registration rejection message in response to transmitting the response message.

6. An apparatus to detect a false base station, the apparatus comprising:
 a transmitter that transmits a request message comprising a non-access stratum message to the false base station; and
 a hardware processor that, in response to the transmitted request message, attempts to authenticate with a unified data management (UDM), authentication server function (AUSF), or a combination thereof;
 wherein, in response to successfully authenticating with UDM, AUSF, or the combination thereof, the transmitter transmits a response message comprising first location information corresponding to the apparatus to an access and mobility management function (AMF) to enable the AMF to detect the false base station.

7. The apparatus of claim 6, wherein the response message comprises a security mode complete message, a deregistration request message, or a combination thereof.

8. The apparatus of claim 6, wherein the hardware processor compares the first location information from the response message with second location information available in the apparatus, and the hardware processor detects the false base station based on a location information mismatch, wherein the second location information available in the apparatus comprises location information received by the apparatus from one or more network devices and stored in the apparatus.

9. The apparatus of claim 6, wherein the transmitter transmitting the response message comprising the first location information comprises the transmitter transmitting the response message comprising location information indicating a location to the apparatus to one or more network devices.

10. The apparatus of claim 6, further comprising a receiver that receives a registration rejection message in response to the transmitter transmitting the response message.

11. A method at an access and mobility management function (AMF) to detect a false base station, the method comprising:
 receiving a request message comprising a non-access stratum message from a base station,
 in response to receiving the request message, attempting authentication between a unified data management (UDM), authentication server function (AUSF), or a combination thereof and a user equipment; and
 in response to successfully authenticating the user equipment, receiving a response message comprising first location information corresponding to the user equipment to facilitate detecting the false base station.

12. The method of claim 11, wherein the response message comprises a security mode complete message, a deregistration request message, or a combination thereof.

13. The method of claim 11, further comprising comparing the first location information from the response message with second location information available in the user equipment, and detecting the false base station based on a location information mismatch, wherein the second location information available in the user equipment comprises location information received by the user equipment from one or more network devices and stored in the user equipment.

14. The method of claim 11, wherein receiving the response message comprising the first location information comprises receiving the response message comprising location information indicating a location of the user equipment.

15. The method of claim 11, further comprising transmitting a registration rejection message in response to receiving the response message.

16. An apparatus to detect a false base station, the apparatus comprising:
 a receiver that receives a request message comprising a non-access stratum message from a base station; and
 a hardware processor that, in response to receiving the request message, attempts authentication between a unified data management (UDM), authentication server function (AUSF), or a combination thereof and a user equipment;
 wherein, in response to successfully authenticating the user equipment, the receiver receives a response message comprising first location information corresponding to the user equipment to facilitate detecting the false base station.

17. The apparatus of claim 16, wherein the response message comprises a security mode complete message, a deregistration request message, or a combination thereof.

18. The apparatus of claim 16, wherein the hardware processor compares the first location information from the response message with second location information available in the user equipment, and the hardware processor detects a false base station based on a location information mismatch, wherein the second location information available in the user equipment comprises location information received by the user equipment from one or more network devices and stored in the user equipment.

19. The apparatus of claim 16, wherein the receiver receiving the response message comprising the first location information comprises the receiver receiving the response message comprising location information indicating a location of the user equipment.

20. The apparatus of claim 16, further comprising a transmitter that transmits a registration rejection message in response to the receiver receiving the response message.

* * * * *